United States Patent
Descombes et al.

(10) Patent No.: US 9,296,116 B2
(45) Date of Patent: Mar. 29, 2016

(54) MANUAL CUTTING TOOL

(71) Applicant: FISKARS FRANCE SAS, Wissous (FR)

(72) Inventors: Frédéric Gilbert Descombes, Sainte Helene du Lac (FR); Chris Thelisson, Bourgoin Jallieu (FR)

(73) Assignee: FISKARS FRANCE SAS, Wissous (FR)

( * ) Notice: Subject to any disclaimer, the term of this patent is extended or adjusted under 35 U.S.C. 154(b) by 120 days.

(21) Appl. No.: 14/225,099

(22) Filed: Mar. 25, 2014

(65) Prior Publication Data

US 2014/0317937 A1    Oct. 30, 2014

(30) Foreign Application Priority Data

Apr. 26, 2013 (FR) ..................... 13 00981

(51) Int. Cl.
*B26B 17/02* (2006.01)
*A01G 3/025* (2006.01)

(52) U.S. Cl.
CPC ............. *B26B 17/02* (2013.01); *A01G 3/0251* (2013.01)

(58) Field of Classification Search
CPC ...... A01G 3/025; A01G 3/0251; B26B 17/02; B23D 29/02; B25B 7/22; H02G 1/005
See application file for complete search history.

(56) References Cited

U.S. PATENT DOCUMENTS

| | | | |
|---|---|---|---|
| 873,004 A * | 12/1907 | Backscheider | A43D 5/06 30/176 |
| 3,372,478 A | 3/1968 | Wallace et al. | |
| 2009/0044412 A1 | 2/2009 | Hsieh | |
| 2011/0162213 A1 | 7/2011 | Goetz et al. | |
| 2011/0258860 A1* | 10/2011 | Chervenak | B26B 17/02 30/266 |
| 2012/0186087 A1 | 7/2012 | Huang | |
| 2013/0227842 A1* | 9/2013 | Takahashi | B23D 29/02 30/193 |
| 2014/0317937 A1* | 10/2014 | Descombes | A01G 3/0251 30/192 |

FOREIGN PATENT DOCUMENTS

| | | | |
|---|---|---|---|
| DE | 199 49 511 A1 * | 4/2001 | |
| DE | 20 2008 013 798 U1 | 3/2009 | |
| EP | 2 796 035 A1 * | 10/2014 | |
| FR | 2 411 056 * | 7/1979 | |
| FR | 2 004 891 * | 10/2014 | |
| GB | 2479982 A * | 11/2011 | |

* cited by examiner

*Primary Examiner* — Hwei C Payer
(74) *Attorney, Agent, or Firm* — Oliff PLC

(57) ABSTRACT

The invention relates to a manual cutting tool including two jaws each provided with a cutting blade, the two jaws being mounted movable in rotation with respect to a securing system so as to define a closed position and an open position of a cutting area. The tool also includes two cams mounted rotating with respect to the two jaws and each including an aperture, and a bearing surface having a variable curvature, the two bearing surfaces being configured so as to be in permanent connection. The tool includes two connection parts positioned on the axes of rotation of the jaws and configured to connect the cams to the jaws.

9 Claims, 6 Drawing Sheets

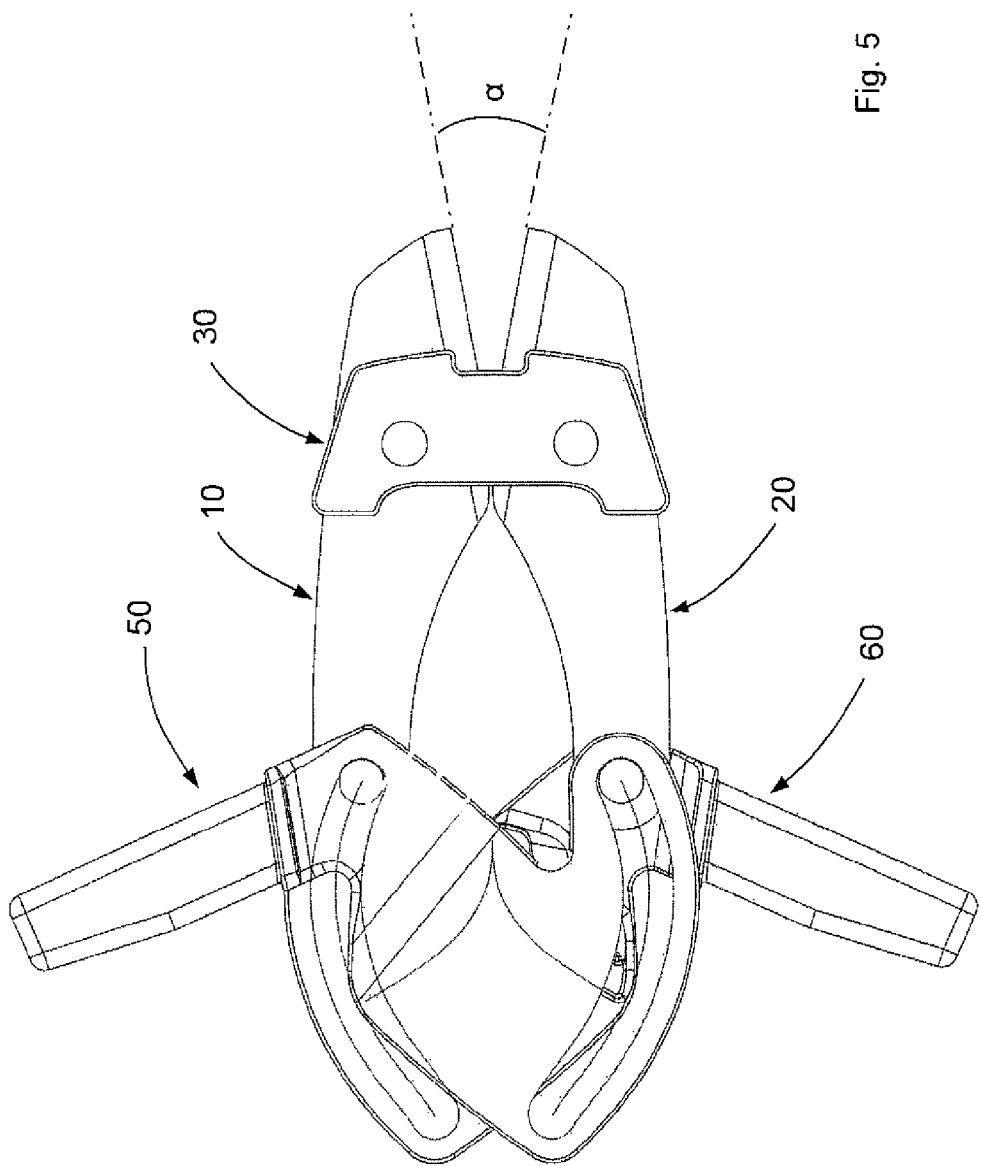

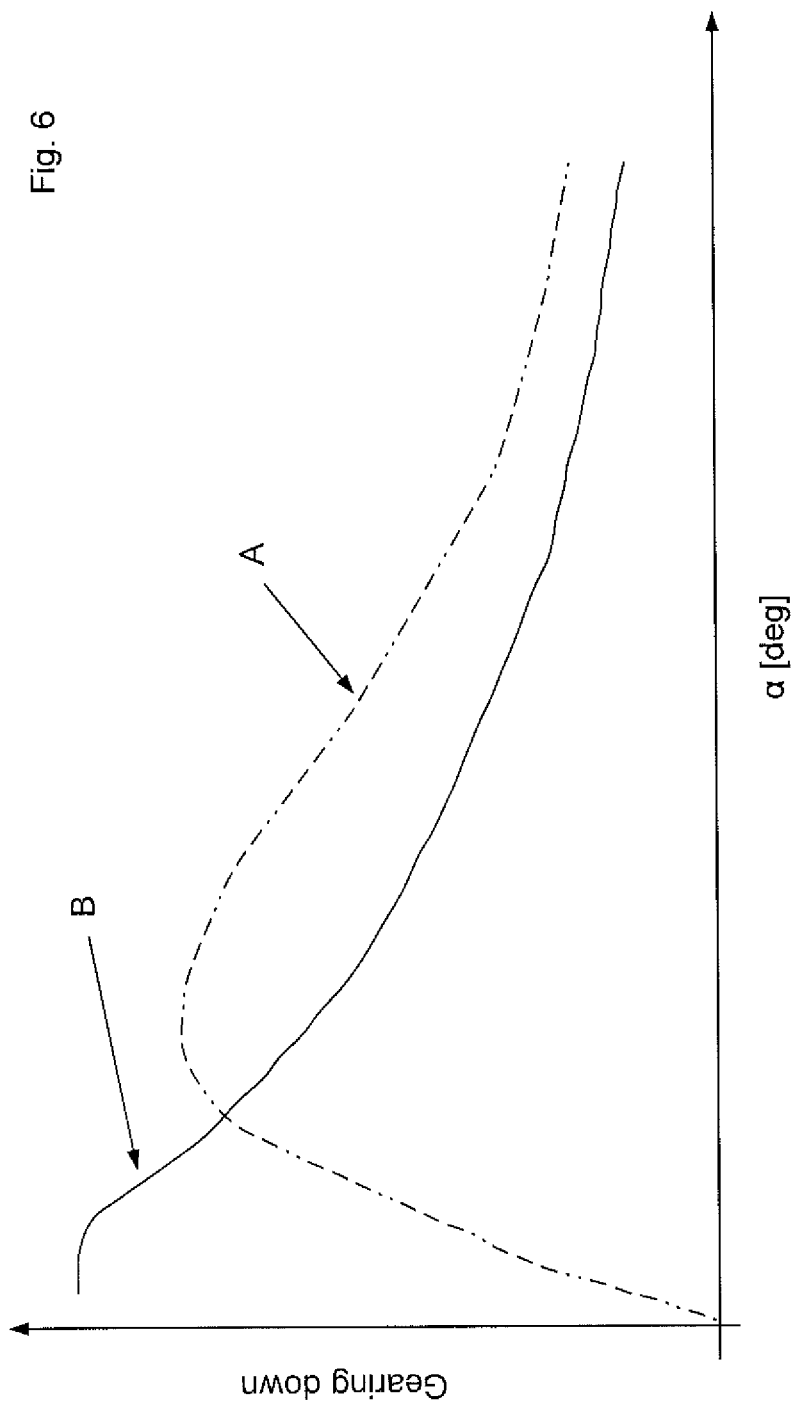

MANUAL CUTTING TOOL

BACKGROUND OF THE INVENTION

The invention relates to a manual cutting tool, in particular a tool enabling large objects to be cut.

STATE OF THE ART

Cutting tools form part of the conventional tools used in the field of amateur or professional DIY jobs.

One of the best known tools are for example cutting pliers. They enable small objects such as metal wires or cables to be cut, and are therefore extensively used by electricians. In the gardening field, a tool that is widely used is the pruner or secateurs used for cutting thin branches having a maximum thickness of a few millimeters.

Cutting pliers and secateurs operate in similar manner to scissors. When making his cut, the user exerts a maximum torque force on the object to be cut when the latter has already been incised over about 60% of its total thickness. If the object to be cut is thin, this is not detrimental, but the thicker it is, the more difficult it is to start cutting it and the less clean the final cut is.

Consequently, one drawback of this type of instrument is that it does not enable objects of large diameter to be cut, as the force that can be exerted with this type of tool is limited.

To multiply the force and therefore to cut larger objects, one solution can be to increase the length of the handle of the tool. This then constitutes a move-up into the category of bolt cutters, hedge trimmers, etc.

In alternative manner, it is possible to use tools provided with a toggle system, which enables the force exerted by the user on the part to be cut to be multiplied. This type of tool comprises cutting blades fitted on the one hand in rotation in criss-cross manner on lever arms and on the other hand in rotation with respect to one another, the axis of rotation common to the cutting blades being positioned between the cutting area and the two axes of rotation connecting the cutting blades to the lever arms.

When cutting is performed with a bolt cutter, it might be thought that the metal part is to a great extent cut by the cutting part of the tool. However the breaking pattern of the metal part shows that the part is first cut and then torn off.

OBJECT OF THE INVENTION

One object of the invention consists in providing a manual cutting tool enabling large objects to be cut while exerting a lesser force than with tools of the prior art.

The cutting tool advantageously comprises two jaws each provided with a cutting blade, the two jaws being mounted movable in rotation with respect to a securing system so as to define a closed position and an open position.

The cutting tool further comprises a first cam mounted rotating with respect to the first jaw and comprising a first bearing surface having a first variable curvature and a first aperture.

It also comprises a second cam mounted rotating with respect to the second jaw and comprising a second bearing surface having a second variable curvature and a second aperture, the second bearing surface being configured so as to be in permanent flat connection with the first bearing surface.

In order to transmit the movement from the first cam to the first jaw, a first connection part is positioned on the axis of rotation of the first cam with respect to the first jaw and is configured to connect the latter. This first connection part is at least partially housed in the second aperture.

Likewise, a second connection part is positioned on the axis of rotation of the second cam with respect to the second jaw and is configured to connect the second cam and the second jaw and to be at least partially housed in the first aperture.

In this way, the amplitude of rotation of the first cam is equal to the length of the arc of the first aperture, and the amplitude of rotation of the second cam is equal to the length of the arc of the second aperture.

The first cam can also comprise a first set of teeth, and the second cam can comprise a second set of teeth configured to intermesh with the first teeth of the first cam.

According to an embodiment of the invention, the first and second bearing surfaces can be in contact in an area where their curvature is maximum when the cutting area presents an opening angle comprised between 3 and 6.5 degrees.

Furthermore, the first connection part is placed in an area of maximum curvature of the second aperture when the cutting area presents an opening angle $\alpha$ comprised between 3 and 6.5 degrees. Likewise, the second connection part is placed in an area of maximum curvature of the first aperture when the cutting area presents an opening angle $\alpha$ comprised between 3 and 6.5 degrees.

The first cam can further be securedly united to a first lever arm, and the second cam be securedly united to a second lever arm.

According to one embodiment, the first and second bearing surfaces can be in contact in an area where their curvature is maximum when the lever arms have an opening comprised between 20 and 40% of their maximum opening.

Furthermore, the first connection part is placed in an area of maximum curvature of the second aperture when the lever arms have an opening comprised between 20 and 40% of their maximum opening. Likewise, the second connection part is placed in an area of maximum curvature of the first aperture when the lever arms have an opening comprised between 20 and 40% of their maximum opening.

According to a particular embodiment of the invention, the axes of rotation of the first jaw and of the second jaw with respect to the securing system can be parallel.

In alternative manner, the axes of rotation of the first jaw and of the second jaw with respect to the securing system can be identical.

BRIEF DESCRIPTION OF THE DRAWINGS

Other advantages and features will become more clearly apparent from the following description of particular embodiments of the invention given for non-restrictive example purposes only and represented in the appended drawings, in which:

FIG. 5 represents a view of the cutting tool according to the embodiment of FIG. 1 when the jaws are partially open, FIG. 6 schematically represents the variation of gearing down versus the opening of the cutting area for a conventional device of the prior art and for an embodiment of the manual cutting tool.

DETAILED DESCRIPTION

Figure 1:
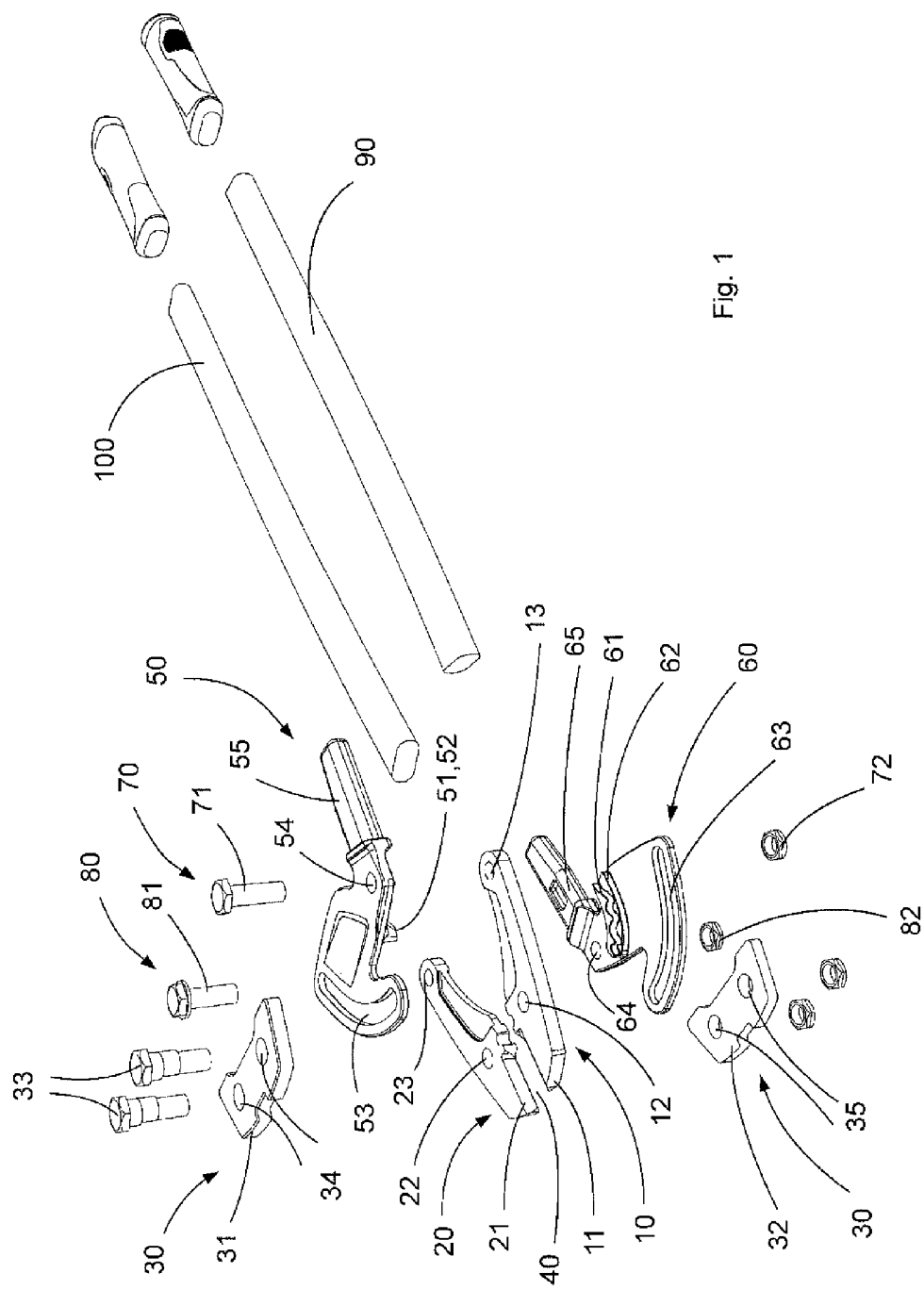
FIG. 1 is an exploded view of a manual cutting tool according to one embodiment.
Figure 2:
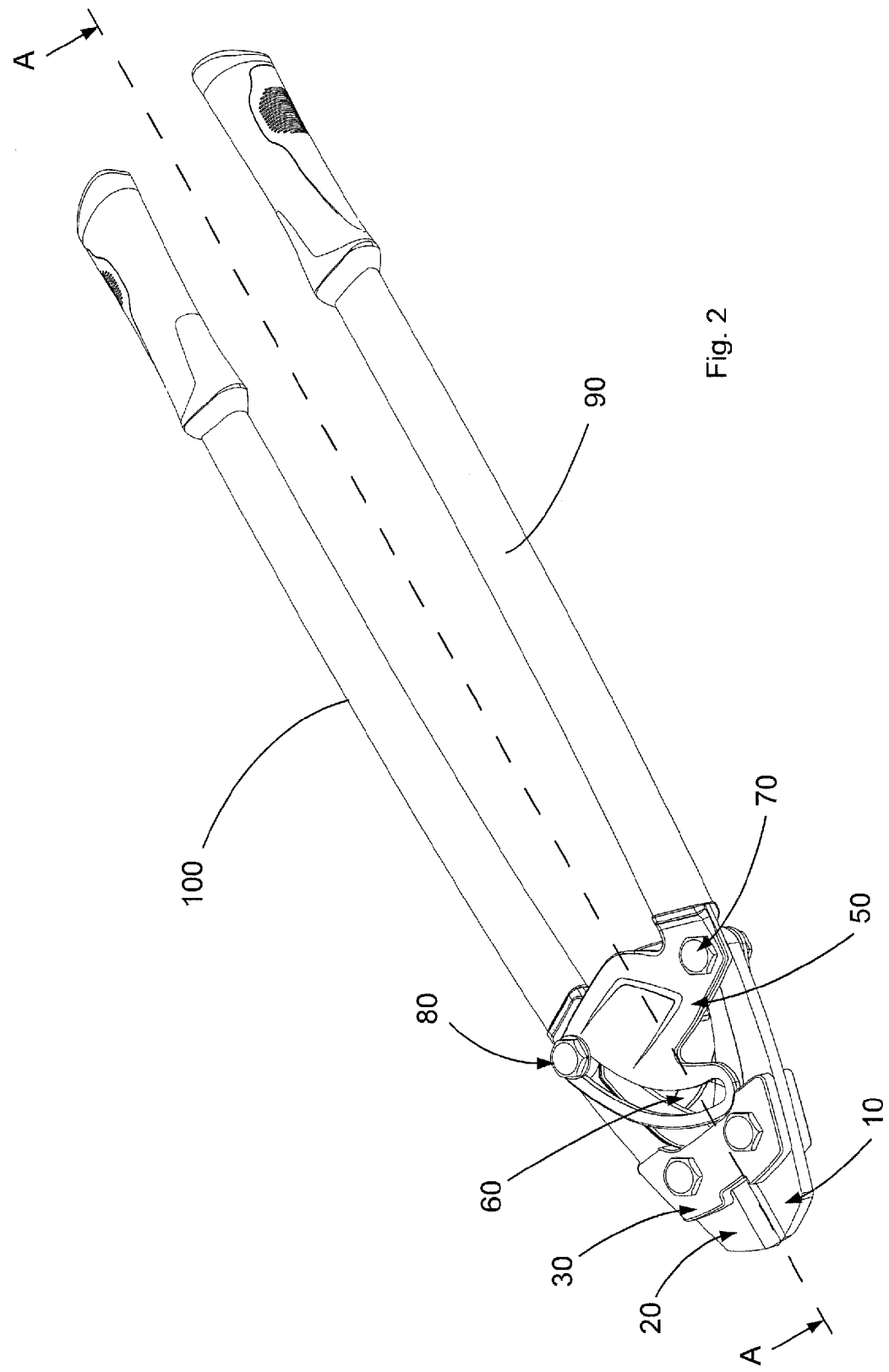
FIG. 2 represents a view of the cutting tool according to the embodiment presented in FIG. 1, when the parts are assembled.

In FIGS. 1 and 2, an embodiment of a manual cutting tool designed for cutting large objects has been represented, such as for example a bolt cutter.

The cutting tool comprises a first jaw 10 and a second jaw 20 each provided with a cutting blade 11 and 21 to enable an object to be cut. First and second jaws 10 and 20 are mounted movable in rotation with respect to a securing system 30 so that a cutting area 40 defined by the two blades 11 and 21 can open and close.

According to the embodiments of the cutting tool, the axes of rotation of first jaw 10 and second jaw 20 with respect to the securing system can advantageously be parallel or identical.

FIGS. 1 and 2 present a tool in which the axes of rotation of jaws 10 and 20 of the tool are parallel. In this case, jaws 10 and 20 are advantageously coplanar. In this particular embodiment, jaws 10 and 20 are sandwiched between a first securing plate 31 and a second securing plate 32, and are advantageously secured by means of two bolts 33 passing for example through holes 34 of first securing plate, holes 12 and 22 of first and second jaws 10 and 20, and holes 35 of second securing plate 32.

In an alternative embodiment (not represented) where the axes of rotation of first and second jaws 10 and 20 with respect to securing system 30 are identical, securing system 30 can comprise a single part such as a bolt, a nail or a rivet positioned on the axis of rotation of jaws 10 and 20 and passing through the latter. In this case, jaws 10 and 20 are not coplanar and are assembled in similar manner to scissors.

Figure 3:
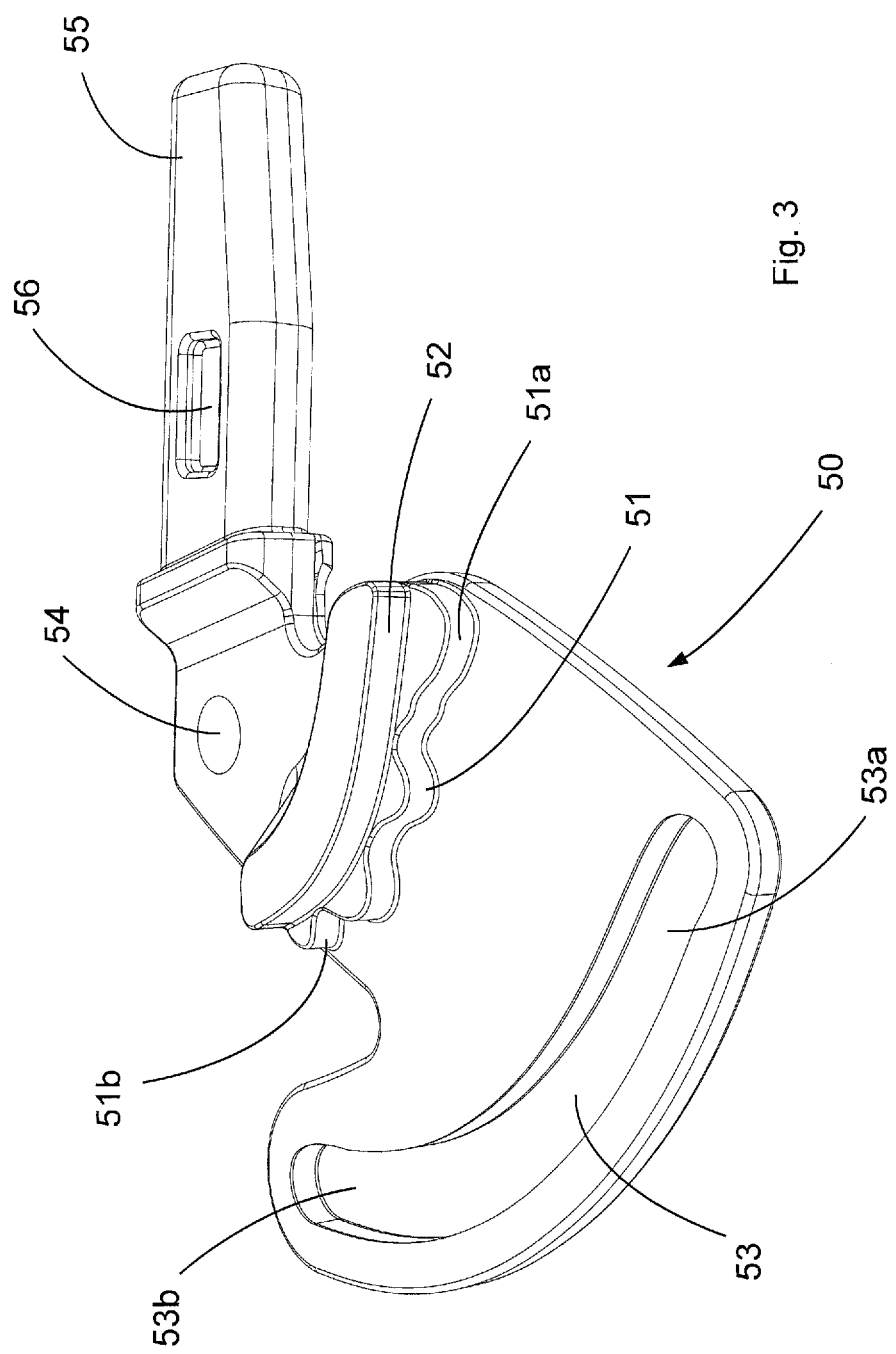
FIGS. 3 and 4 illustrate a particular embodiment of the first and second cams.
Figure 4:
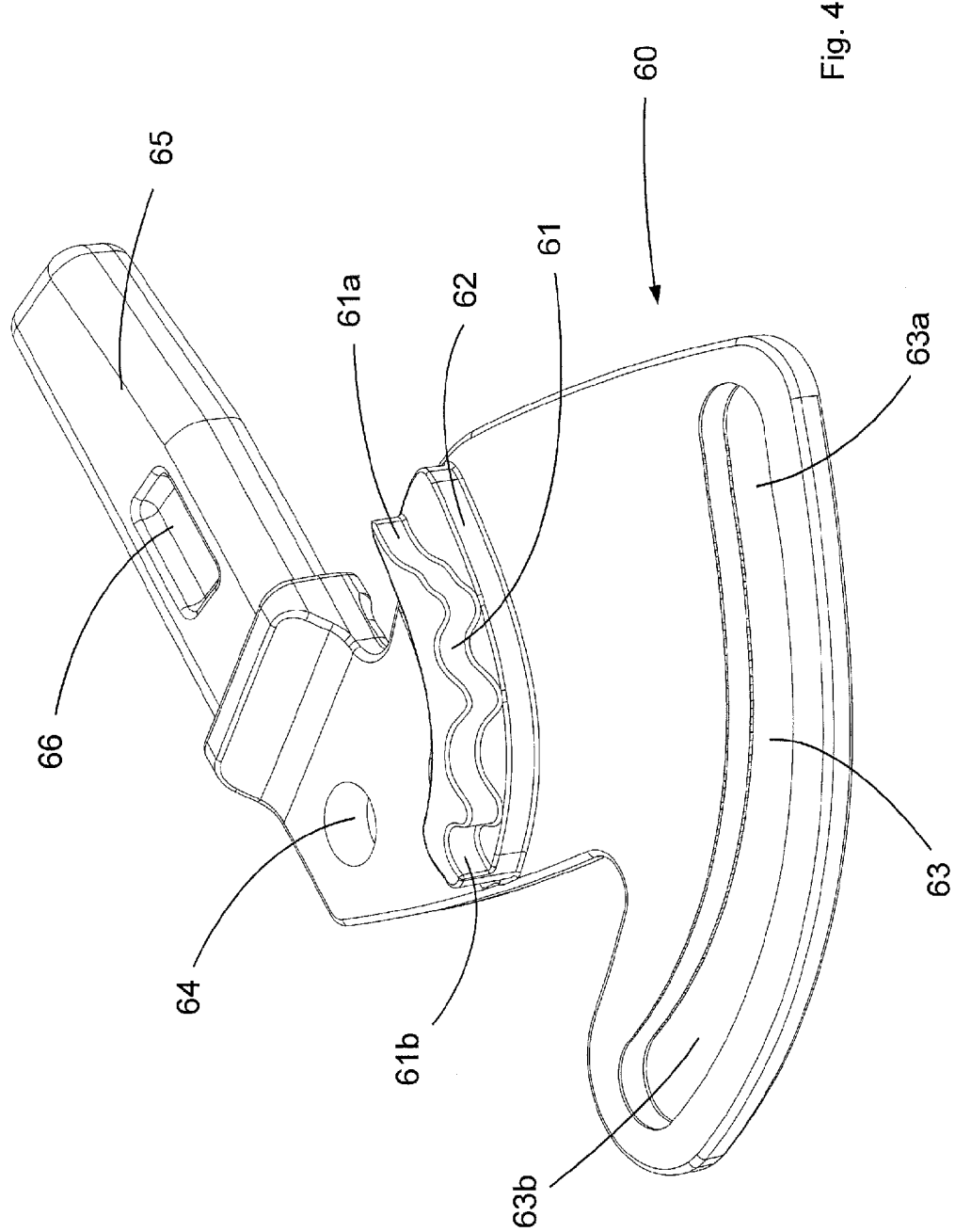

The manual cutting tool also comprises a first cam 50 and a second cam 60, respectively provided with first teeth 51 and second teeth 61 (see FIGS. 3 and 4) configured to intermesh with one another.

Cams 50 and 60 are also provided with bearing surfaces 52 and 62. More precisely, first bearing surface 52 of first cam 50 is placed above first set of teeth 51, whereas second bearing surface 62 of second cam 60 is placed above second set of teeth 61.

Bearing surfaces 52 and 62 enable high torque forces to be applied when cutting an object, whereas teeth 51 and 61 prevent sliding of first cam 50 with respect to second cam 60 during the cutting operation.

First and second cams 50 and 60 are further provided with a first aperture 53 and a second aperture 63.

First and second cams 50 and 60 are advantageously mounted rotating respectively on first jaw 10 and on second jaw 20.

For this, a first connection part 70, for example a bolting system comprising a bolt 71 and nut 72 is positioned on the axis of rotation of first cam 50 with respect to first jaw 10. It passes through a hole 54 of first cam 50, a hole 13 of first jaw 10 and penetrates into second aperture 63 of second cam 60.

In similar manner, a second connection part 80 such as a bolt 81 and nut 82 passes through a hole 64 of second cam 60, a hole 23 of second jaw 20, and penetrates into first aperture 53 of first cam 50.

In this way, the amplitude of rotation of first cam 50 corresponds to the length of the arc of first aperture 53, and the amplitude of rotation of second cam 60 corresponds to the length of the arc of second aperture 63.

To prevent friction, a clearance of about one millimeter is provided between securing system 30 and first and second cams 50 and 60 when the latter are in the closed position. When the first and second cams are in the open position, the latter are located at a distance from the securing system (see FIG. 5). In this way, there is no contact between the cams and the securing system during use of the cutting tool. Risks of damaging the tool are therefore lesser when a user exerts a strong force when cutting an object.

The cutting tool can advantageously be mounted on first and second lever arms 90 and 100, in particular first cam 50 can be securedly united to first lever arm 90 and second cam 60 can be securedly united to second lever arm 100.

In the embodiment illustrated in the figures, first cam 50 is provided with a first stem 55 comprising a first mortise 56, and second cam 60 is provided with a second stem 65 comprising a second mortise 66. First and second mortises 56 and 66 are advantageously configured to collaborate with tenons (not shown) situated inside first and second lever arms 90 and 100. This enables quick and solid assembly of the lever arms on the cutting tool to be performed.

During use of the tool, lever arms 90 and 100 are moved apart by the user who makes first lever arm 90 pivot in the clockwise direction and second lever arm 100 pivot in the counterclockwise direction. Cams 50 and 60 being securedly united to lever arms 90 and 100, this results in first cam 50 rotating in the clockwise direction and second cam 60 rotating in the counter-clockwise direction.

Connection parts 70 and 80 move towards one another when lever arms 90 and 100 move apart, which enables jaws 10 and 20 to be made to pivot with respect to securing system 30, so that cutting area 40 moves from a closed position to an open position. The distance separating connection parts 70 and 80 is at its maximum when the cutting tool is closed and is at its minimum when the cutting tool is fully open.

Furthermore, when the user moves lever arms 90 and 100 apart, connection part 70 moves inside second aperture 63 from an area 63a to an area 63b. Likewise, connection part 80 moves inside first aperture 53 from an area 53a to an area 53b.

Connection parts 70 and 80 are respectively located in areas 63a and 53a when the cutting tool is in the closed position, and are located in areas 63b and 53b when the cutting tool is in the open position.

Furthermore, when lever arms 90 and 100 are moved apart, bearing surface 52 of first cam 50 slides along bearing surface 62 of second cam 60. The line of contact between bearing surfaces 52 and 62 is advantageously orthogonal to the central axis of symmetry AA presented by the cutting tool.

In the course of opening of the cutting tool, first set of teeth 51 and second set of teeth 61 intermesh with one another from the back of cams 50 and 60, i.e. from areas 51a and 61a, to the front, i.e. areas 51b and 61b.

The shape of set of teeth 51 and 61 is designed to prevent any sliding of first and second cams 50 and 60 with respect to one another. The risk of sliding is maximum when the object has not yet been incised and the user is starting cutting, i.e. when the tool is open. It is then areas 51b and 61b of the teeth which interact, and the latter are consequently configured to sustain torques of high force by means of deep teeth.

When the object is incised, the risk of sliding of cams 50 and 60 with respect to one another decreases, and it is therefore possible to modify the shapes of the teeth in areas 51a and 61a so that the latter are less deep and their pitch is larger. This results in the global shape of each set of teeth 51 and 61 being irregular, but the latter can be adjusted according to the stresses exerted on the tool and to the user's requirements.

Unlike cutting tools of the prior art, and in particular systems provided with toggles, the forces exerted by the user are advantageously geared down when he needs them most. Indeed, with a toggle system, gearing down of the force increases continuously as the user progressively closes the lever arms, i.e. when the opening of the cutting area decreases. Gearing down of a toggle system is maximum when the lever arms are almost closed, i.e. after the object has been cut. On the contrary, the cutting tool enables a large gearing down during cutting of the object, followed by a small or zero gearing down after the object has been cut.

For illustrative purposes, FIG. 6 schematically represents the variations of gearing down of an embodiment of a cutting tool (plot A) and of a toggle system (plot B) versus the opening angle α of cutting area 40 (cf. FIG. 5).

For gearing down to be optimal during cutting of an object, the shapes of first and second bearing surfaces 52 and 62 and the shapes of first and second apertures 53 and 63 are chosen appropriately.

In the embodiment presented in the figures, when bearing surfaces 52 and 62 are in contact in areas having a maximum curvature, gearing down is maximum. Likewise, when connection parts 70 and 80 are positioned in areas of apertures 53 and 63 having a maximum curvature, gearing down is maximum.

The structure of the manual cutting tool can advantageously be configured for a certain type of object to be completely severed when the gearing down is maximum or close to its maximum. What is meant by type of object is for example metal objects such as bolts, concrete bits or wooden objects such as branches.

In a particular embodiment suitable for cutting metal objects, the manual cutting tool is advantageously configured in such a way that gearing down is maximum when lever arms 90 and 100 have an opening comprised between 20 and 40% of their maximum opening, or when there is an opening α of cutting area 40 comprised between 3 and 6.5 degrees.

When the opening of lever arms 90 and 100 becomes less than 20% of the maximum opening, or for an angle α of less than 3 degrees, the curvature of bearing surfaces 52 and 62, and the curvature of apertures 53 and 63 advantageously decreases, which enables gearing down to be reduced, or even reduced to zero.

An opening α of cutting area 40 comprised between 3 and 6.5 degrees is very suitable for cutting metal objects or objects having a hardness range similar to that of metal objects. In this particular embodiment of the tool, if the object of the cut is made from a material of lesser hardness, the object is severed when the opening of cutting area 40 is less than 3 degrees. Inversely, an object made from a material of greater hardness is severed when the opening of cutting area 40 is more than 6.5 degrees.

Furthermore, according to a particular embodiment, areas 53a and 63a of the apertures can advantageously have an opposite curvature to that of the rest of the apertures. Inverting the sign of the curvature enables it to be ensured that opening α of cutting area 40 is zero when lever arms 90 and 100 are in the closed position, i.e. when their opening is minimum. This provides a safety feature to prevent any accident from occurring, for example when the user is handling the tool.

Finally, the different parts which make up the tool are made from a sufficiently rigid material to be able to withstand the cutting stresses. A material that is for example able to be used is steel. In the case where the tool is a bolt cutter, cutting blades 11 and 21 can advantageously be made from tempered steel.

The invention claimed is:

1. A manual cutting tool comprising:
   a first jaw and a second jaw, each provided with a cutting blade, the first jaw and the second jaw being mounted movable in rotation with respect to a securing system so as to define a closed position and an open position of a cutting area,
   a first cam mounted rotating with respect to the first jaw, comprising a first bearing surface having a first variable curvature, and a first aperture,
   a second cam mounted rotating with respect to the second jaw, comprising a second bearing surface having a second variable curvature, the second bearing surface being configured to be in permanent flat connection with the first bearing surface, and a second aperture,
   a first connector positioned on an axis of rotation of the first cam with respect to the first jaw and configured to connect the first cam and the first jaw and to be at least partially housed in the second aperture so that an amplitude of rotation of the second cam is equal to a length of an arc of the second aperture,
   a second connector positioned on an axis of rotation of the second cam with respect to the second jaw, configured to connect the second cam and the second jaw and to be at least partially housed in the first aperture so that an amplitude of rotation of the first cam is equal to a length of an arc of the first aperture.

2. The manual cutting tool according to claim 1, wherein:
   the first cam comprises a first set of teeth,
   the second cam comprises a second set of teeth configured to intermesh with the first set of teeth of the first cam.

3. The manual cutting tool according to claim 1, wherein the first and second bearing surfaces are in contact in an area where their curvature is maximum when the cutting area presents an opening angle comprised between 3 and 6.5 degrees.

4. The manual cutting tool according to claim 1, wherein the first connector is placed in an area of maximum curvature of the second aperture, and wherein the second connector is placed in an area of maximum curvature of the first aperture when the cutting area presents an opening angle comprised between 3 and 6.5 degrees.

5. The manual cutting tool according to claim 1, wherein:
   the first cam is securedly united to a first lever arm, and
   the second cam is securedly united to a second lever arm.

6. The manual cutting tool according to claim 5, wherein the first and second bearing surfaces are in contact in an area where their curvature is maximum when the lever arms have an opening comprised between 20 and 40% of their maximum opening.

7. The manual cutting tool according to claim 5, wherein the first connector is placed in an area of maximum curvature of the second aperture, and wherein the second connector is placed in an area of maximum curvature of the first aperture when the lever arms have an opening comprised between 20 and 40% of their maximum opening.

8. The manual cutting tool according to claim 1, wherein the axes of rotation of the first jaw and of the second jaw with respect to the securing system are parallel.

9. The manual cutting tool according to claim 1, wherein the axes of rotation of the first jaw and of the second jaw with respect to the securing system are identical.

* * * * *